UNITED STATES PATENT OFFICE.

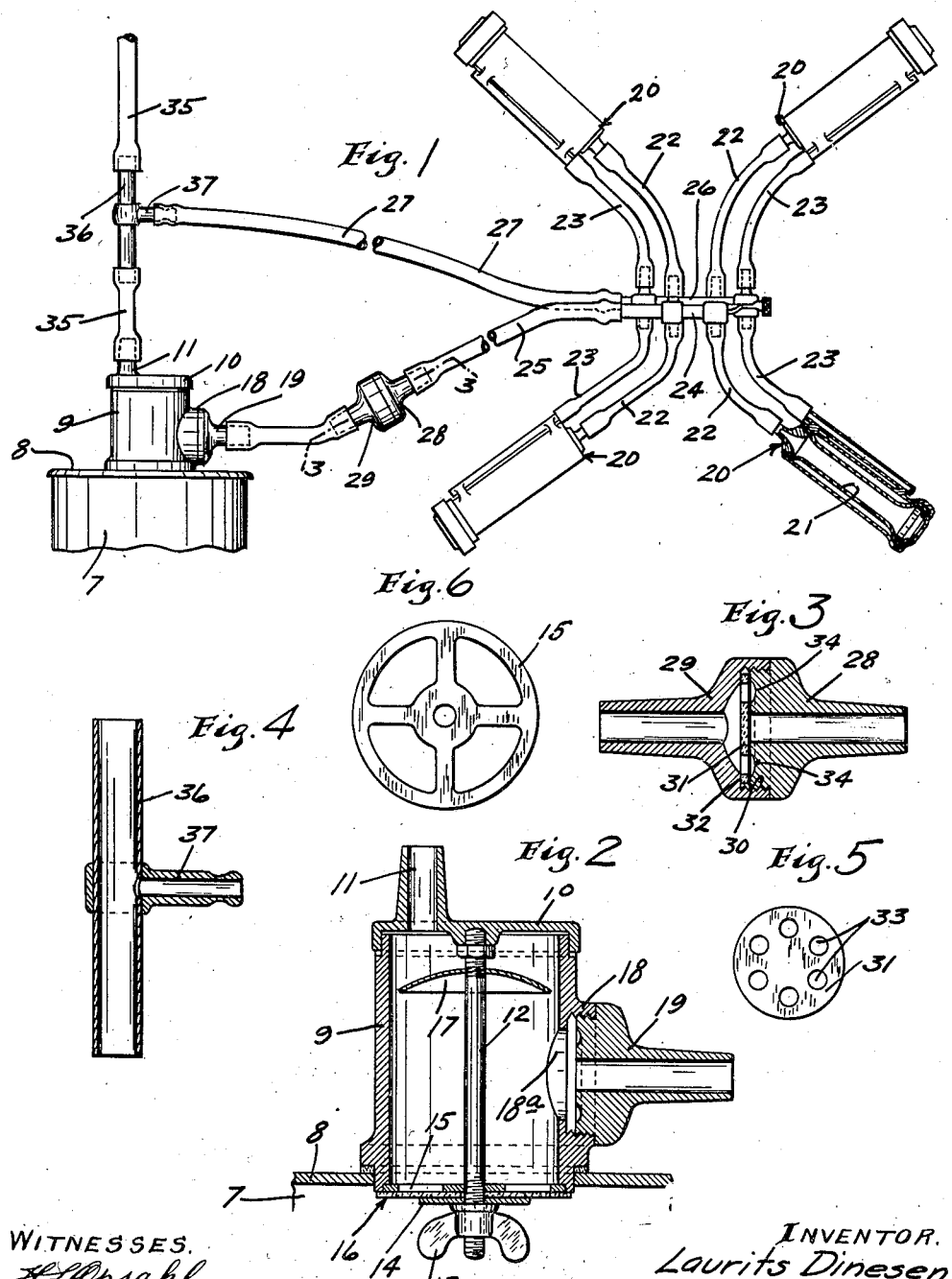

LAURITS DINESEN, OF MINNEAPOLIS, MINNESOTA.

MILKING APPARATUS.

1,307,539.　　　　　Specification of Letters Patent.　　Patented June 24, 1919.

Application filed April 9, 1918.　Serial No. 227,423.

*To all whom it may concern:*

Be it known that I, LAURITS DINESEN, a citizen of the United States, residing at Minneapolis, in the county of Hennepin and State of Minnesota, have invented certain new and useful Improvements in Milking Apparatus; and I do hereby declare the following to be a full, clear, and exact description of the invention, such as will enable others skilled in the art to which it appertains to make and use the same.

This invention relates to milking apparatus of the type wherein a milk pail or can is not subjected to vacuum and wherein the milk is drawn into a milk chamber that is distinct from the milk pail or can, and in which milk chamber the partial vacuum or pressure pulsations are produced. More particularly, the invention further relates to milking apparatus involving teat cups having double chamber teat cups of the general character disclosed in my prior Patent No. 1,072,584, of date, September 9, 1913, and a preferred form of which is disclosed and claimed in my prior Patent No. 1,201,808, of date, October 17, 1916.

The present invention is designed as an improvement on or modification of the type of milking apparatus disclosed and broadly claimed in my prior Patent No. 1,261,780 of date, April 9th, 1918. In fact, the present invention is particularly directed to features which make it an easy matter to convert into a system capable of using double chamber teat cups, certain milking apparatus which, as designed, can use only the single chamber teat cups.

The invention is illustrated in the accompanying drawings wherein like characters indicate like parts throughout the several views. Referring to the drawings;

Figure 1 is a view partly in elevation, partly in diagram, and partly in section and with some parts broken away, showing the improved milking apparatus;

Fig. 2 is an enlarged vertical section taken axially through the so-called milk chamber and its intermediate connections including a portion of the milk can cover;

Fig. 3 is a detail in section on the line 3—3 of Fig. 1;

Fig. 4 is a vertical section of a T-shaped tube coupling forming a part of the air connections;

Fig. 5 is a face elevation of a check valve used in the coupling shown in section in Fig. 3; and Fig. 6 is a plan view of a skeletonized washer that is applied to the bottom of the milk chamber shown in section on Fig. 2.

The milk can or pail which may be of the usual or any suitable construction, is indicated by the numeral 7 and its removable cover is indicated by the numeral 8. This cover serves as a supporting base for the so-called milk chamber 9, which latter is preferably, and as shown, of cylindrical form and the lower end of which is passed through said cover and rigidly secured thereto.

Fitted to the upper end of the chamber 9 with an air-tight joint is a cap 10, which, at one side of its axis, has a tubular nipple 11. A clamping bolt 12 is attached at its upper end, preferably by threaded engagement to an axial boss of the cap 10 and is extended downward to a point below the lower end of the said chamber, and at its lower end is threaded and provided with a thumb nut 13. The thumb nut 13 directly supports a metal washer 14 that is of considerably less diameter than the interior of the chamber 9. Detachably fitted into the lower end of the chamber 9 is a skeletonized washer or disk 15 through the axis of which the bolt 12 is also passed. The numeral 16 indicates a rubber disk that is clamped between the washers 14 and 15 and normally closes the ports or openings in the skeletonized washer 15. This pliable rubber disk 16 acts as a check valve which will open to permit a downward flow of milk from the milk chamber 9 into the can when said chamber is relieved from suction or partial vacuum but will close said ports when said chamber is subjected to partial vacuum.

Obviously, when the nut 13 is removed, the elements 14, 15 and 16 may be quickly and easily removed, as required, for good sterilization of the apparatus.

Working with threaded engagement on the upper end of the bolt 12 is a baffle plate 17 preferably in the form of a concavo-convex metal shell that is of slightly less diameter than the interior of the milk chamber 9.

On one side, the milk chamber 9 has an internally threaded boss 18 into which the threaded shank of a detachable tubular nipple 19 is adapted to be screwed with an air-tight joint.

The teat cups 20 are formed with concentric chambers separated by an expansible and contractible rubber tube 21, and the inner and outer chambers of said two cups are connected, respectively by two branch rubber tubes 22 and 23. The branch milk tubes 22 of the several teat cups are connected by metal coupling tube 24 to the main milk tube 25, whereas the several branch air tubes 23 are connected by a coupling tube 26 to an air tube 27. As shown in Fig. 1, the main milk tube 25 is made up of two sections and between the sections is interposed a check valve mechanism, preferably such as best shown in detail in Fig. 3, wherein the casing of said valve mechanism comprises two tubular nipples 28 and 29. The nipple 28 has a slightly reduced externally threaded shank 30 that is screwed into internal threads of the nipple 29. The check valve proper is in the form of a rubber disk 31, the rim of which is clamped between the end of the shank 30 and an opposing shoulder 32 formed within the extended portion of the nipple 29. Thus the rubber diaphragm or disk 31 is held at its rim with freedom for lateral movement at its central portion. The central portion thereof is imperforate, so that it will normally close the passage through the nipple 28, but just inward of its rim it is formed with a plurality of passages 33 that aline with an annular depression 34 formed in the nipple 28. This disk-like check valve will freely open to permit the milk to be drawn from the teat cups through the tube 25 and into the milk chamber 9, but it will close to prevent air from flowing through said tube 25 in a direction from the milk chamber into the teat cups.

The numeral 35 indicates a main air tube that is connected to the nipple 11 of the milk chamber 9 and is extended to a suitable device for producing pressure pulsations, to wit, for relatively producing partial vacuum and air pressure within the said milk chamber. It is a common practice to use a double ended cylinder and coöperating piston for producing these pressure pulsations.

The main air pipe 35 is shown as sectioned and between the sections thereof, is interposed a coupling tube 36 provided with a laterally projecting tubular nipple 37 to which the end of the air pipe 35 is connected, as shown in Fig. 1. In accordance with my invention, a milking apparatus designed for producing pulsations for single chamber teat cups may be converted into a milking apparatus employing double chamber teat cups simply by substituting such double chamber teat cups with connections substantially as illustrated in Fig. 1 and inserting the valve mechanism 28—29 in the milk tube 25 and inserting the coupling 36—37 in the main air tube 35 and connecting the same to the air tube 27. With the form of milk chamber shown in the drawings, however, it will be noted that the nipple 19 is of the same construction as the nipple 28 and that the boss 18 of the chamber 9 is formed with an internal annular shoulder 18ª between which and the threaded shank of the nipple 19, the rubber valve 31 may be inserted; and in this instance it would not be necessary to insert the valve mechanism 28—29 in the intermediate portion of the milk tube 25.

Obviously, when partial vacuum is produced in the air tube 35 and milk chamber 9, milk will be drawn from the teat cups through the milk tubes 22, 24 and 25 into the milk chamber, and at the same time, partial vacuum will be produced in the annular outer chamber of the teat cups, thus relieving the tubular diaphragms 21 from external pressure and permitting the same to expand. When pressure above atmospheric pressure is produced in the tube 35 and in the milk chamber 9, increased pressure will be produced also in the outer annular chambers of the teat cups, and the tubular elastic diaphragms 21 will then be contracted producing a milking action closely approximating that produced in the hand milking action.

Of course, when the pressure is produced in the milk chamber 9, check valve 31 will close and check valve 16 will be opened, and the milk will be discharged through the ports at 15 into the milk can. In this type of milking apparatus, as already indicated, the pressure pulsations are not produced in the milk can and the cover of the said can need not, therefore, fit the can with an air-tight joint. The baffle plate 17 prevents the milk from splashing in the upper portion of the chamber 9 and, hence, from getting into the air tubes through the nipple 11.

Obviously, with the simple attachments illustrated, it is an easy matter to apply double chamber teat cups, or teat cups with flexible interior tubes to milking apparatus primarily designed for use with single chamber teat cups. The so-called double chamber teat cups have in practice been found much more efficient in action and much easier on the cows than the so-called single chamber teat cups.

What I claim is:

1. In a milking apparatus, the combination with a teat cup having a flexible wall dividing the same into two chambers, of a milk chamber having a discharge passage equipped with a check valve, a milk conduit connecting the inner chamber of said teat cup to said milk chamber, said conduit including a flexible milk tube and a check valve structure interposed in said tube, a pulsator air tube connected to said milk chamber, and an air conduit extended from the outer chamber of said teat cup and subject to varying pressure produced through said pulsator tube.

2. In a milking apparatus, the combination with a teat cup having a flexible wall dividing the same into two chambers, of a milk chamber having a discharge passage equipped with a check valve, a milk conduit connecting the inner chamber of said teat cup to said milk chamber, said conduit including a flexible milk tube and a check valve structure interposed in said tube, a pulsator air tube connected to said milk chamber, a coupling tube interposed in said pulsator tube and provided with a laterally projecting nipple, and an air conduit extended from the outer chamber of said teat cup and including a flexible tube applied to the nipple of said coupling tube.

3. In a milking apparatus, the combination with teat cups having tubular elastic walls dividing the same into central and surrounding chambers, of a milk chamber having a discharge valve, a pulsator tube connected to said milk chamber, a milk conduit connecting the inner chambers of said teat cups to said milk chamber, said conduit including a flexible milk tube and a check valve structure detachably interposed therein.

In testimony whereof I affix my signature in presence of two witnesses.

LAURITS DINESEN.

Witnesses:
 CLARA DEMAREST,
 EVA E. KÖNIG.